Dec. 16, 1969   TADAMI TAOKA ET AL   3,484,150
GONIO-MICROSCOPE

Filed April 4, 1966                    2 Sheets-Sheet 1

INVENTORS
Tadami Taoka
Eiichi Furubayashi
Shin Takeuchi
BY Stevens, Davis, Miller & Mosher
ATTORNEYS

United States Patent Office 3,484,150
Patented Dec. 16, 1969

3,484,150
GONIO-MICROSCOPE
Tadami Taoka, Tokyo, Eiichi Furubayashi, Yokohama, and Shin Takeuchi, Tokyo, Japan, assignors to Director of National Research Institute for Metals, Tokyo, Japan, an organ of the government of Japan
Filed Apr. 4, 1966, Ser. No. 539,877
Claims priority, application Japan, Apr. 7, 1965, 40/20,051
Int. Cl. G02b 23/16, 21/24; G02f 1/30
U.S. Cl. 350—85                       1 Claim

ABSTRACT OF THE DISCLOSURE

A microscope equipped with a goniometer for observing facets of a specimen and for precisely measuring the inclination of the facets. The microscope is provided with a slit arranged at the back focal point of the objective lens and a mechanism for automatically maintaining the focused point at a point to be observed on the specimen.

---

This invention relates to a microscope, and particularly to a gonio-microscope.

The object of this invention is to provide an improved gonio-microscope having a rotatable slit of variable width at the back focal plane of the objective lens for the precise determination of small angles between component planes of specimen surfaces.

Another object of this invention is to provide an improved gonio-microscope in which the rotating axis of a rotatable stage intersects the optical axis of the microscope at the focal point, and in which the extension of the horizontal axis of the microscope tilting mechanism shifts vertically together with the microscope as a single unit and intersects the optical axis at a right angle at the front focal point of the objective lens, thus keeping the exact focusing during operation of the microscope.

Still another object of this invention is to provide an improved microscope having a specimen stage mounted on a rotatable stage so that a specimen can be shifted to any desired position without causing deviation of the central axis of the rotatable stage from the optical axis.

A precise and quick measurement of the orientation of crystal grains of metal by the determination of the direction of a normal to a component crystal plane of an etch pit of a metallic crystal, or through the determination of the direction of a normal to a micro-facet of a machine part will have a broad application and contribute to many fields of research.

A gonio-microscope of this invention is a microscope for measuring precisely and quickly an inclination of any plane in the field of view by observing a plane to be measured.

In a metallographical microscope in a bright field illumination mode an image of a light source is formed at the back focal point of an objective lens and a specimen is illuminated perpendicularly to its surface by a parallel flux of light passed through the objective lens. Light rays of the flux which are directed to a horizontal plane of the specimen are reflected at the surface of the specimen and proceed backwardly, focused again at the back focal point of the objective lens and further proceed along straight line paths to enter an eyepiece. Light rays directed to a slightly sloped surface of the specimen enter the objective lens at a certain angle and further proceed to enter the eyepiece without passing through the back focal point of the objective lens. On the contrary, light rays directed to a considerably sloped surface of the specimen deviate completely from the objective lens and do not reach the eyepiece. Thus since the light rays directed to a slightly sloped surface of the specimen as well as those which are directed to a horizontal plane of the specimen enter the eyepiece, the slightly sloped surface cannot be discerned from the horizontal surface of the specimen.

In this invention, a slit is provided at the back focal plane of the objective lens, the width and the direction of the slit being varied. With this slit, light rays reflected from a slightly sloped surface of the specimen are interrupted and do not reach the eyepiece. Thus a slightly sloped surface can be discerned from a horizontal surface, i.e. a very small angle between component planes can be discerned.

Further, by tilting the microscope so that the light axis thereof is directed perpendicularly to a slightly sloped surface of the specimen, the light rays directed to the slightly sloped surface perpendicularly thereto will reflect regularly and proceed backwardly to pass through the back focal point, while all other light rays will be interrupted by the slit or deviate from the objective lens, and do not reach the eyepiece. In this case, only the slightly sloped plane can be observed brightly. By reading the tilted angle of the microscope in this position, the angle between the slightly sloped surface and the horizontal plane can be determined.

The slope of each component plane of the specimen may be in a random direction. The determination of such an angle of sloped surface in a random direction can be made by first, tilting the microscope, with the slit parallel to its tilting axis, and selecting the orientation in which a plane to be observed is seen most brightly; and second, rotating the slit about the vertical axis by 90° and selecting the orientation in which the plane to be observed is seen with brightest illumination. By successively repeating the above two operations, selecting the direction of the brightest illumination and reading the tilted angle of the microscope and rotated angle of the specimen stage, the direction normal to the plane to be observed can be determined.

In case the focus becomes out of or a point to be observed deviates from the center of the field of view during the measuring operation, the compensation thereof is quite troublesome and the measurement will be quite difficult, and in some cases the measurement will be impossible.

Such troubles are eliminated by the gonio-microscope of this invention.

Other objects and advantages of this invention will appear in the following description when referenced to the accompanying drawings in which:

FIG. 1b shows a field of view of the specimen surface of FIG. 1a;

FIG. 2b shows a field of view of the specimen surface of FIG. 2a;

FIG. 3b shows a field of view of the specimen surface of FIG. 3a;

FIG. 4b is a side view, partially in section, of the gonio-microscope shown in FIG. 4a;

Figure 1A:
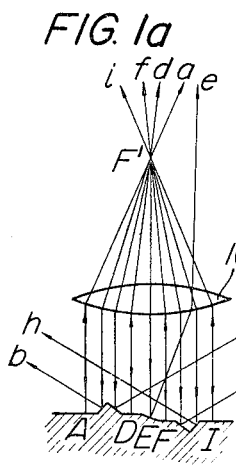
FIG. 1a shows diagrammatically an objective lens and a part of a specimen surface, illustrating the passages of light rays.
Figure 1B:
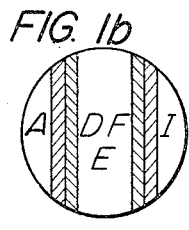

Referring now to FIGS. 1a and 1b, an image of a light source is formed at the back focal F′ of an objective lens 10 and a surface of a specimen is illuminated by a parallel flux of light which has passed through the objective lens 10. A part of the flux, for example, the light rays a, d, f and i, which are directed to the horizontal planes A, D, F and I of the specimen are reflected at the surface of the specimen and proceed backwardly, focused again at the point F′, and further travel along straight line paths to an eyepiece. On the other hand the light ray e, which is projected on a slightly sloped plane E enters the objective lens with a certain angle and reaches the eyepiece without passing through the point F′. On the contrary, the light rays b, c, g and h, which are projected on the remarkably sloped planes, deviate from the objective lens and do not reach the eyepiece. Thus the field of view will be as illustrated in FIG. 1b. In this case, the plane E cannot be discerned from other planes.

Figure 2A:
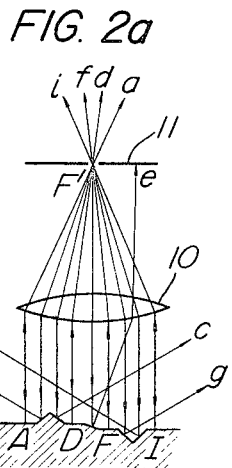
FIG. 2a shows diagrammatically an objective lens having a slit at its back focal plane and a part of a specimen surface, illustrating the passages of light rays.
Figure 2B:
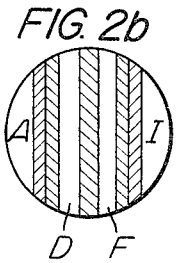

In FIG. 2a, a slit 11 is provided at the back focal plane of the objective lens and the light ray e is interrupted by the slit, thus the light ray e cannot reach the eyepiece. Accordingly the field of view will be as illustrated in FIG. 2b, where the plane E is dark and can be discerned from the other planes A, D, F, and I. Thus the very small slope angle can be detected sharply.

Figure 3A:
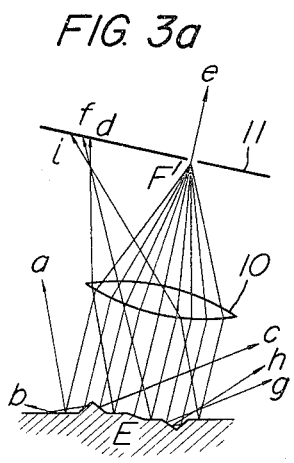
FIG. 3a shows diagrammatically an objective lens having a slit at its back focal plane and a part of a specimen surface, the objective lens and the slit being tilted.
Figure 3B:
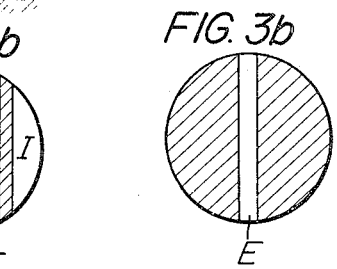

As shown in FIG. 3a, when the microscope is tilted so that the optical axis comes to a position perpendicular to the plane E, the light ray e reflects regularly at the plane E, and travels backwardly to the point F′, thus passes through the slit, while other light rays are interrupted by the slit or otherwise deviate from the objective lens and do not reach the eyepiece. Accordingly the field of view will be as illustrated in FIG. 3b, where only the plane E can be seen brightly. By reading the tilted angle of the microscope at this position, the angle between the plane E and the horizontal plane can be determined. As for the other planes, the tilting angles thereof against the horizontal plane can be measured in similar operations performed successively.

In the descriptions hitherto, the tilting of the surface of specimen is considered to be limited to the left or to the right direction. As a matter of fact, the component planes of a specimen tilt in random directions. For the determination of the orientation, the slit is rotated about the vertical axis by an angle of 90° to select the brightest position during the rotation. Next, the slit is rotated to the original position, and the microscope is tilted to select the brightest position. With these two steps of operations, the direction perpendicular to a plane being observed can be determined.

Figure 4A:
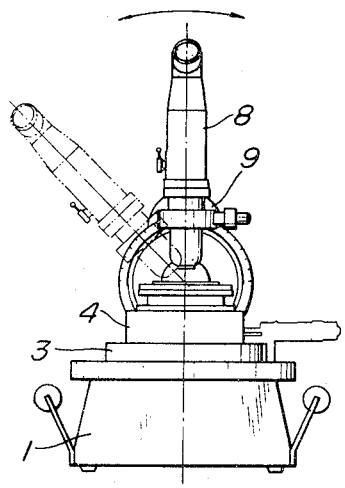
FIG. 4a is a front view of the gonio-microscope of this invention.
Figure 4B:
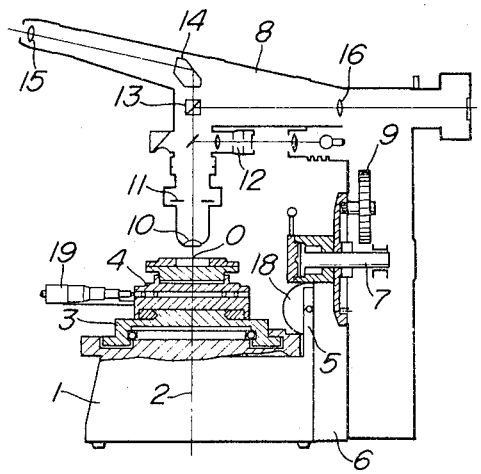

FIGS. 4a and 4b show the construction of a gonio-microscope of which the objective lens is provided with a slit according to the principle explained above.

A circular stage 3 with a vertical axis 2 is mounted on a base 1, and a cross-movable stage 4, which is movable in two directions perpendicular to each other in a horizontal plane, is mounted on the circular stage 3.

On the other hand, a fixed pillar 5 secured to the base 1 supports a vertically slidable pillar 6 which a vertical slot in which a dove-tailed part projecting on the vertical side of the movable pillar is engaged slidably. The movable pillar 6 can be moved upwardly and downwardly, i.e. vertically, by using a rack and pinion mechanism 18. The movable pillar 6 supports a microscope body 8 with its horizontal arm 7, and can be tilted by means of a finger knob 9. The microscope body 8 is provided with an objective lens 10, an objective slit 11, an illuminating apparatus 12, a semi-transparent prism 13, an erect image prism 14, an eyepiece 15 and a photo lens 16.

In operation a specimen 17 is mounted on the cross movable stage 4, and while observing the specimen with the eyepiece 15 with the slit 11 wide opened, the microscope body 8 is adjusted in height so as to focus an image of the specimen surface. Next, the specimen is shifted with a microscrew 19 attached to the cross movable stage 4 a distance necessary to coincide the point to be observed in the field of view with the center of field of view. Then the preparation has been accomplished. After that, the direction normal to the very small plane to be observed can be determined by slowly tilting the microscope body and slowly rotating the stage with the slit width reduced, thus selecting the position where the point to be observed is seen most brightly.

If the point to be observed deviates from the center of the field of view or becomes out of focus, the compensation thereof is troublesome and the measurement will be quite difficult, or may be impossible. The construction of an automatic centering apparatus to avoid such trouble and make the operations rapid and easy will next be described.

As clearly shown in FIGS. 4a and 4b in the first, the vertical axis 2 of the circular stage 4 intersects the optical axis of the objective lens at the focal point 0, and the cross movable stage 4 is mounted on the circular stage 3. Therefore the rotating axis of the circular stage 3 always passes through the focal point of the objective and is kept unvaried even if the specimen is shifted by the cross movable stage 4, and accordingly the point of the specimen to be observed, when once adjusted to coincide with the center of the field of view, does not deviate from the center of the field of view no matter how the specimen is rotated.

Next, as clearly shown in FIGS. 4a and 4b the extension of the horizontal axis 7 of tilting of the microscope 8 intersects the optical axis of the objective lens 10 and the vertical axis 2 of the circular stage 3 at a right angle respectively at the front focal point 0.

Figure 5A:
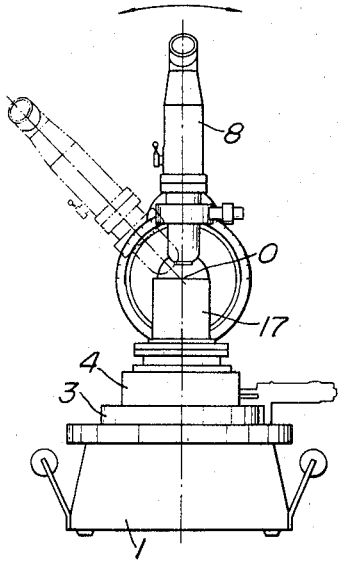
FIG. 5a is a front view of the gonio-microscope of this invention with a specimen mounted thereon.
Figure 5B:
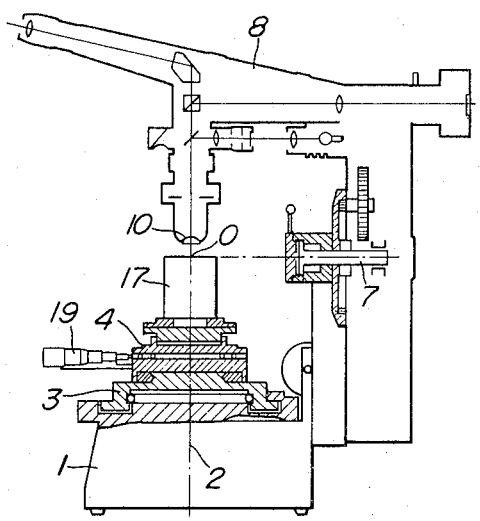
FIG. 5b is a side view, partially in section, of the gonio-microscope shown in FIG. 5a illustrating the performance thereof.

As clearly shown in FIGS. 5a and 5b the horizontal axis 7 moves vertically with the microscope 8 as a single unit, and therefore the extension of the horizontal axis 7 is kept unvaried to pass through the point to be observed on the surface of the specimen even when the point of focus is varied according to the thickness of the specimen. Thus once the microscope is focused to the point to be observed, the focus does not deviate from the point to be observed in spite of the tilting operation of the microscope.

What is claimed is:

1. A gonio-microscope comprising: an objective lens; a microscope body tiltable about a horizontal axis passing through the front focal point of the objective lens; a slit disposed at the back focal point of said objective lens, said slit being variable in both its width and direction; and a specimen support rotatable about a vertical axis passing through said front focal point, said support including a fine adjustment mechanism and a means for measuring the tilted angle of said microscope body and the rotated angle of the specimen support; whereby a focused point on a specimen to be observed remains in focus notwithstanding rotation of the microscope body and the specimen support.

References Cited

UNITED STATES PATENTS

| | | | |
|---|---|---|---|
| 2,794,362 | 6/1957 | Yale | 350—85 X |
| 2,960,913 | 11/1960 | Herrala. | |
| 3,356,437 | 12/1967 | Beamish | 331—94.5 |

OTHER REFERENCES

Hunter, R. S.: Methods of Determining Gloss, Nat. Bur. of Stds. Research, paper No. RP958, January 1937, p. 26.

RONALD L. WIBERT, Primary Examiner

J. ROTHENBERG, Assistant Examiner

U.S. Cl. X.R.

350—271; 356—120, 138, 237